United States Patent
Kaji et al.

(10) Patent No.: US 12,209,865 B2
(45) Date of Patent: Jan. 28, 2025

(54) SENSOR

(71) Applicant: KABUSHIKI KAISHA TOSHIBA, Tokyo (JP)

(72) Inventors: Shiori Kaji, Kawasaki Kanagawa (JP); Ryunosuke Gando, Yokohama Kanagawa (JP); Yasushi Tomizawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 185 days.

(21) Appl. No.: 17/886,065

(22) Filed: Aug. 11, 2022

(65) Prior Publication Data

US 2023/0280163 A1    Sep. 7, 2023

(30) Foreign Application Priority Data

Mar. 3, 2022    (JP) ................ 2022-032508

(51) Int. Cl.
G01C 19/60    (2006.01)
(52) U.S. Cl.
CPC .................. *G01C 19/60* (2013.01)
(58) Field of Classification Search
CPC ............ G01C 19/60; G01C 19/5684
USPC ...................................... 324/71.1
See application file for complete search history.

(56) References Cited

U.S. PATENT DOCUMENTS

| | | |
|---|---|---|
| 7,040,163 B2 | 5/2006 | Shcheglov et al. |
| 2004/0055380 A1 | 3/2004 | Shcheglov et al. |
| 2004/0055381 A1 | 3/2004 | Shcheglov et al. |
| 2005/0172714 A1 | 8/2005 | Challoner et al. |
| 2010/0300202 A1* | 12/2010 | Joyce ............... G01C 19/5663 29/829 |

(Continued)

FOREIGN PATENT DOCUMENTS

| | | |
|---|---|---|
| CN | 110672081 A | 1/2020 |
| EP | 2 438 399 B1 | 7/2015 |

(Continued)

OTHER PUBLICATIONS

Qingsong Li et al., "Nonlinearity Reduction in Disk Resonator Gyroscopes Based on the Vibration Amplification Effect," IEEE Trans. on Ind. Elec., vol. 67, No. 8, pp. 6946-6954 (Aug. 2020).

(Continued)

*Primary Examiner* — Christopher P McAndrew
(74) *Attorney, Agent, or Firm* — Finnegan, Henderson, Farabow, Garrett & Dunner, LLP

(57) ABSTRACT

According to one embodiment, a sensor includes a base body, a first fixed portion, a movable portion, and first and second fixed electrodes. The first fixed portion is fixed to the base body. The movable portion is supported by the first fixed portion. The movable portion includes annular portions and connecting portions. The annular portions are concentric with the first fixed portion as a center in a first plane. One of the connecting portions connects one of the annular portions and an other one of the annular portions. The annular portions include first to third annular portions. The second annular portion includes a first movable portion electrode. The first fixed electrode is fixed to the base body and faces a part of the first annular portion. The second fixed electrode is fixed to the base body and faces the first movable portion electrode.

20 Claims, 12 Drawing Sheets

(56) References Cited

U.S. PATENT DOCUMENTS

| | | |
|---|---|---|
| 2015/0243567 A1* | 8/2015 | Cheng ................... C23C 14/548 |
| | | 324/71.1 |
| 2016/0097642 A1 | 4/2016 | Okami et al. |
| 2016/0298966 A1* | 10/2016 | Ikehashi ............ G01C 19/5762 |
| 2018/0274923 A1 | 9/2018 | Ikehashi |
| 2019/0162694 A1* | 5/2019 | Hayashi ............. G01N 27/4074 |
| 2020/0284582 A1 | 9/2020 | Kaji et al. |
| 2020/0363205 A1 | 11/2020 | Gando et al. |
| 2021/0041475 A1 | 2/2021 | Harada et al. |

FOREIGN PATENT DOCUMENTS

| | | | |
|---|---|---|---|
| EP | 3 217 146 A1 | 9/2017 | |
| JP | 2005-535889 A | 11/2005 | |
| JP | 2008-151728 A | 7/2008 | |
| JP | 2018-163141 A | 10/2018 | |
| JP | 2020-144065 A | 9/2020 | |
| JP | 2020-187018 A | 11/2020 | |
| WO | WO-2021205715 A1 * | 10/2021 | ............... B81B 7/02 |

OTHER PUBLICATIONS

Japan Patent Office, Office Action in JP App. No. 2022-032508, 2 pages, and machine translation, 5 pages (Oct. 25, 2024).

* cited by examiner

SENSOR

CROSS-REFERENCE TO RELATED APPLICATIONS

This application is based upon and claims the benefit of priority from Japanese Patent Application No. 2022-032508, filed on Mar. 3, 2022; the entire contents of which are incorporated herein by reference.

FIELD

Embodiments of the invention generally relate to a sensor.

BACKGROUND

There are sensors such as gyro sensors. It is desired to improve the characteristics of the sensor.

DETAILED DESCRIPTION

Figure 1:
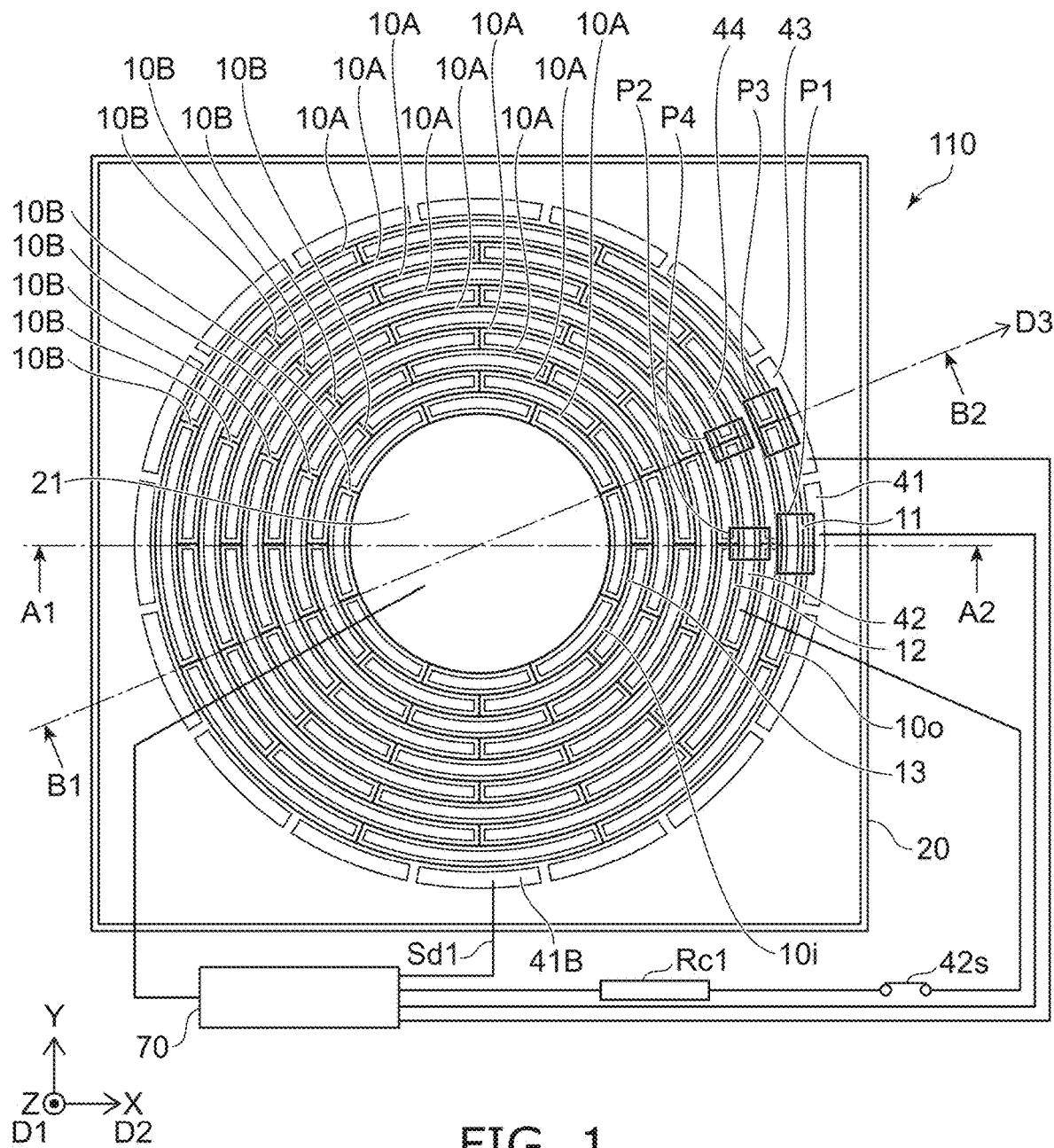
FIG. 1 is a schematic plan view illustrating a sensor according to a first embodiment.

According to one embodiment, a sensor includes a base body, a first fixed portion, a movable portion, a first fixed electrode, and a second fixed electrode. The first fixed portion is fixed to the base body. The movable portion is supported by the first fixed portion. A first gap is provided between the base body and the movable portion. The movable portion includes a plurality of annular portions and a plurality of connecting portions. The annular portions are concentric with the first fixed portion as a center in a first plane crossing a first direction from the base body to the first fixed portion. One of the connecting portions connects one of the annular portions and an other one of the annular portions. The annular portions include a first annular portion, a second annular portion, and a third annular portion. The second annular portion is between the first fixed portion and the first annular portion. The third annular portion is between the first fixed portion and the second annular portion. The second annular portion includes a first movable portion electrode. The first fixed electrode is fixed to the base body and faces a part of the first annular portion. The second fixed electrode is fixed to the base body and faces the first movable portion electrode. The second fixed electrode is one of a first comb tooth electrode pair. The first movable portion electrode is other of the first comb tooth electrode pair.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

Figure 2:
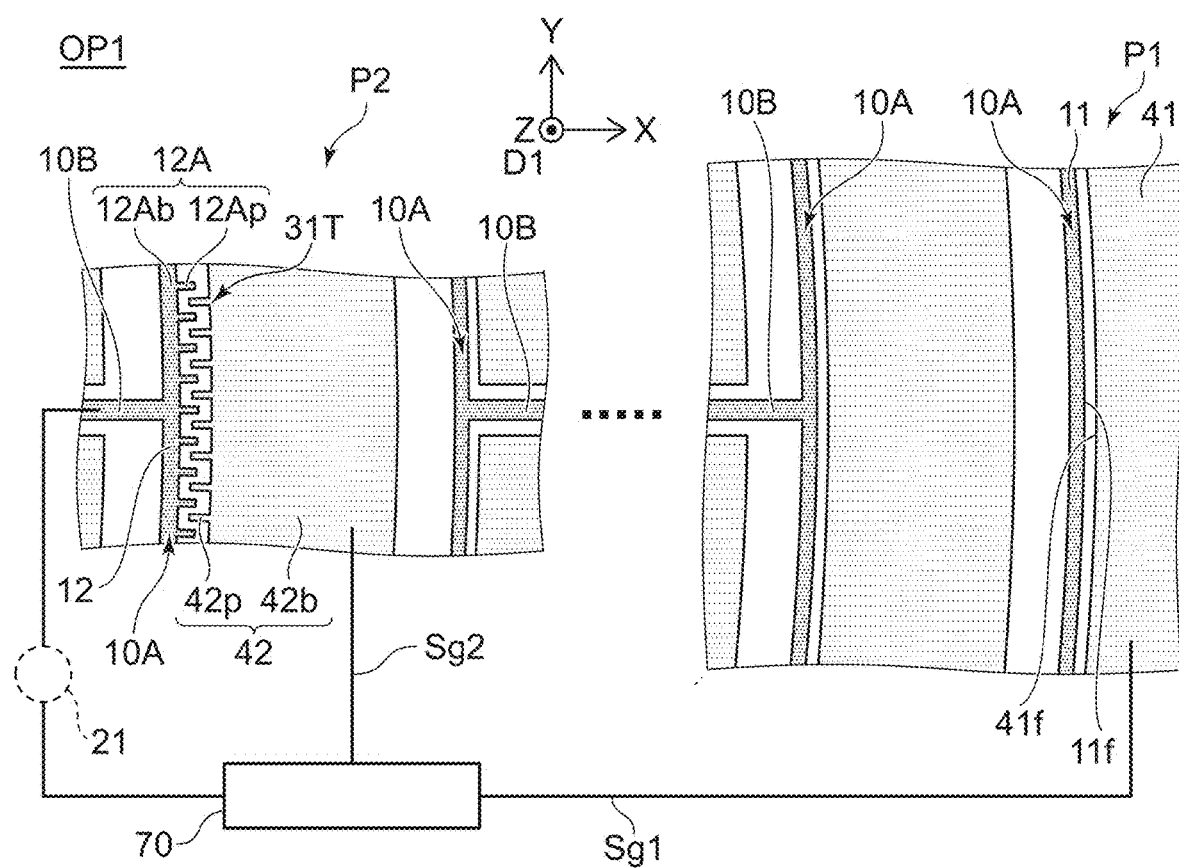
FIG. 2 is a schematic plan view illustrating the sensor according to the first embodiment.
Figure 3:
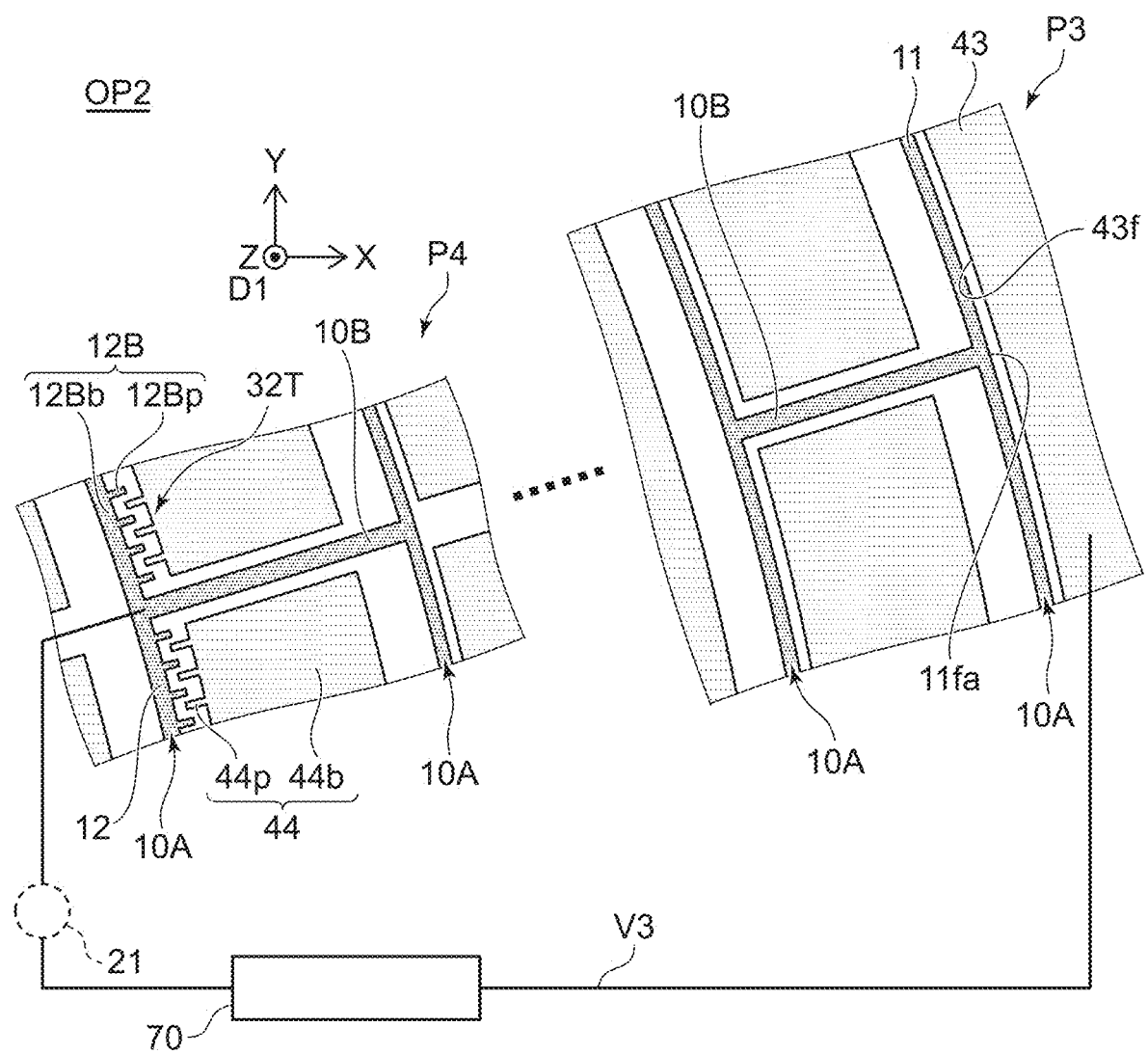
FIG. 3 is a schematic plan view illustrating the sensor according to the first embodiment.

FIGS. 1 to 3 are schematic plan views illustrating a sensor according to a first embodiment.

FIG. 2 shows an enlarged portion P1 and a portion P2 of FIG. 1. FIG. 3 shows an enlarged portion P3 and a portion P4 of FIG. 1.

Figure 4A:
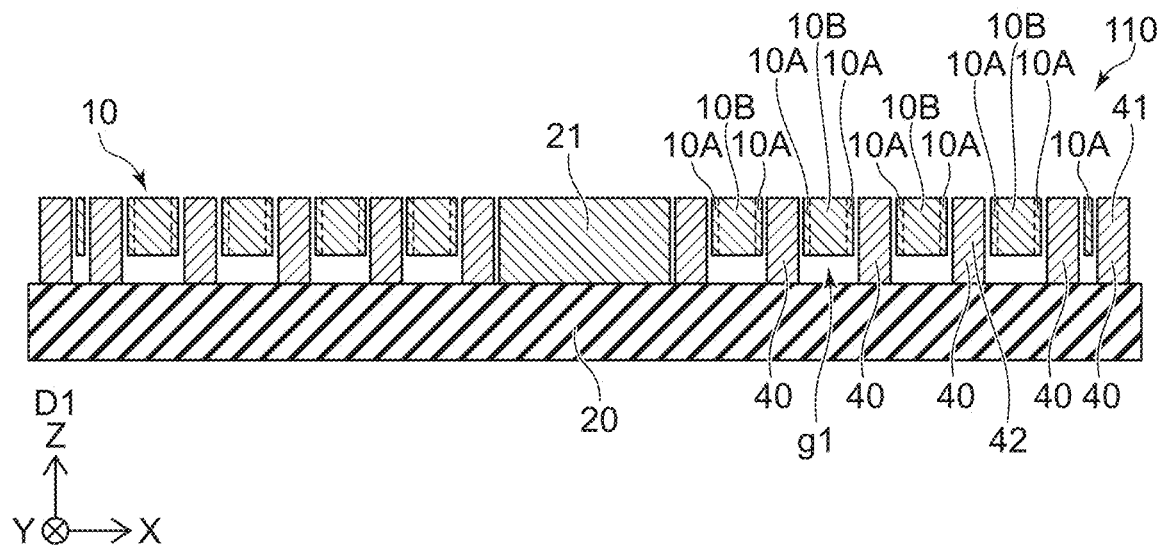
FIGS. 4A and 4B are schematic cross-sectional views illustrating the sensor according to the first embodiment.
Figure 4B:
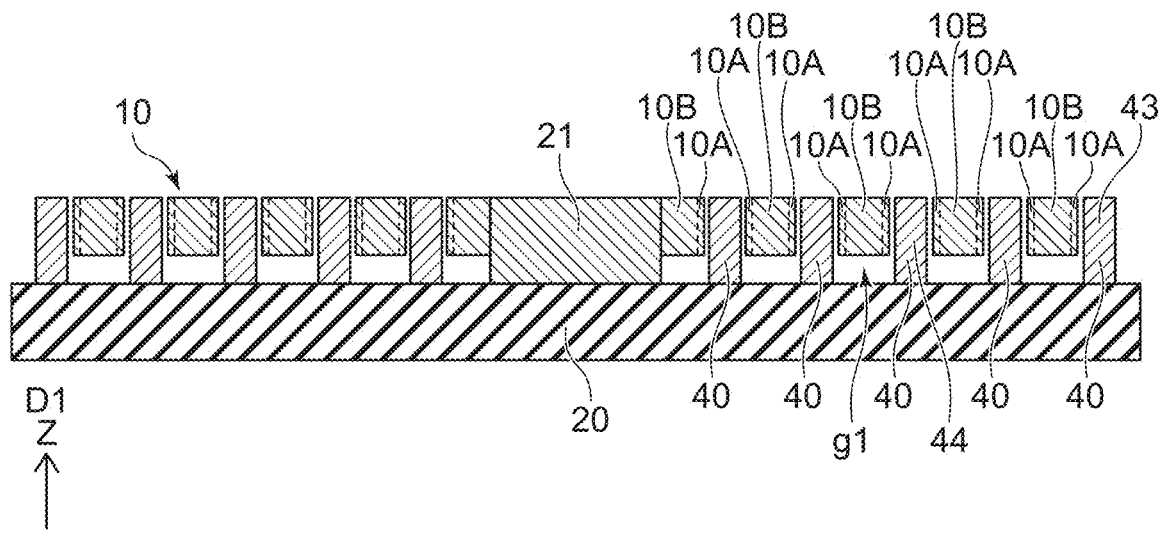

FIGS. 4A and 4B are schematic cross-sectional views illustrating the sensor according to the first embodiment.

FIG. 4A is a sectional view taken along line A1-A2 of FIG. 1. FIG. 4B is a sectional view taken along line B1-B2 of FIG. 1.

A sensor according to the embodiments shown in FIGS. 1, 4A and 4B include a base body 20, a first fixed portion 21, a movable portion 10, a first fixed electrode 41, and a second fixed electrode 42.

The base body 20 may include, for example, a silicon substrate. The first fixed portion 21 is fixed to the base body 20. A first direction D1 from the base body 20 to the first fixed portion 21 is a Z-axis direction. One direction perpendicular to the Z-axis direction is defined as an X-axis direction. The direction perpendicular to the Z-axis direction and the X-axis direction is defined as a Y-axis direction.

The movable portion 10 is supported by the first fixed portion. As shown in FIGS. 4A and 4B, a first gap g1 is provided between the base body 20 and the movable portion 10.

For example, the first fixed portion 21 and the movable portion 10 are conductive. The movable portion 10 is electrically connected to the first fixed portion 21.

As shown in FIG. 1, the movable portion 10 includes a plurality of annular portions 10A and a plurality of connecting portions 10B. A plane crossing the first direction D1 from the base body 20 to the first fixed portion 21 is defined as a first plane. The first plane is, for example, the X-Y plane. The plurality of annular portions 10A are concentric with the first fixed portion 21 as the center in the first plane. One of the plurality of connecting portions 10B connects one of the plurality of annular portions 10A and another one of the plurality of annular portions 10A. As shown in FIG. 1, the plurality of connecting portions 10B extend along an axial direction that passes the first fixed portion 21 and along the first plane. The axial direction is, for example, the radial direction.

For example, the plurality of annular portions 10A are along the X-Y plane. The plurality of annular portions 10A may be substantially circular.

The plurality of annular portions 10A include a first annular portion 11, a second annular portion 12, and a third annular portion 13. The second annular portion 12 is between the first fixed portion 21 and the first annular portion 11. The third annular portion 13 is between the first fixed portion 21 and the second annular portion 12.

As shown in FIG. 1, the movable portion 10 includes an inner edge portion 10i and an outer edge portion 10o. For example, the first annular portion 11 includes an outer edge portion 10o. The third annular portion 13 includes an inner edge portion 10i. The first annular portion 11 is the outermost of the plurality of annular portions 10A. The third annular portion 13 is the innermost of the plurality of annular portions 10A. As shown in FIG. 2, the second annular portion 12 includes the first movable portion electrode 12A.

Figure 5:
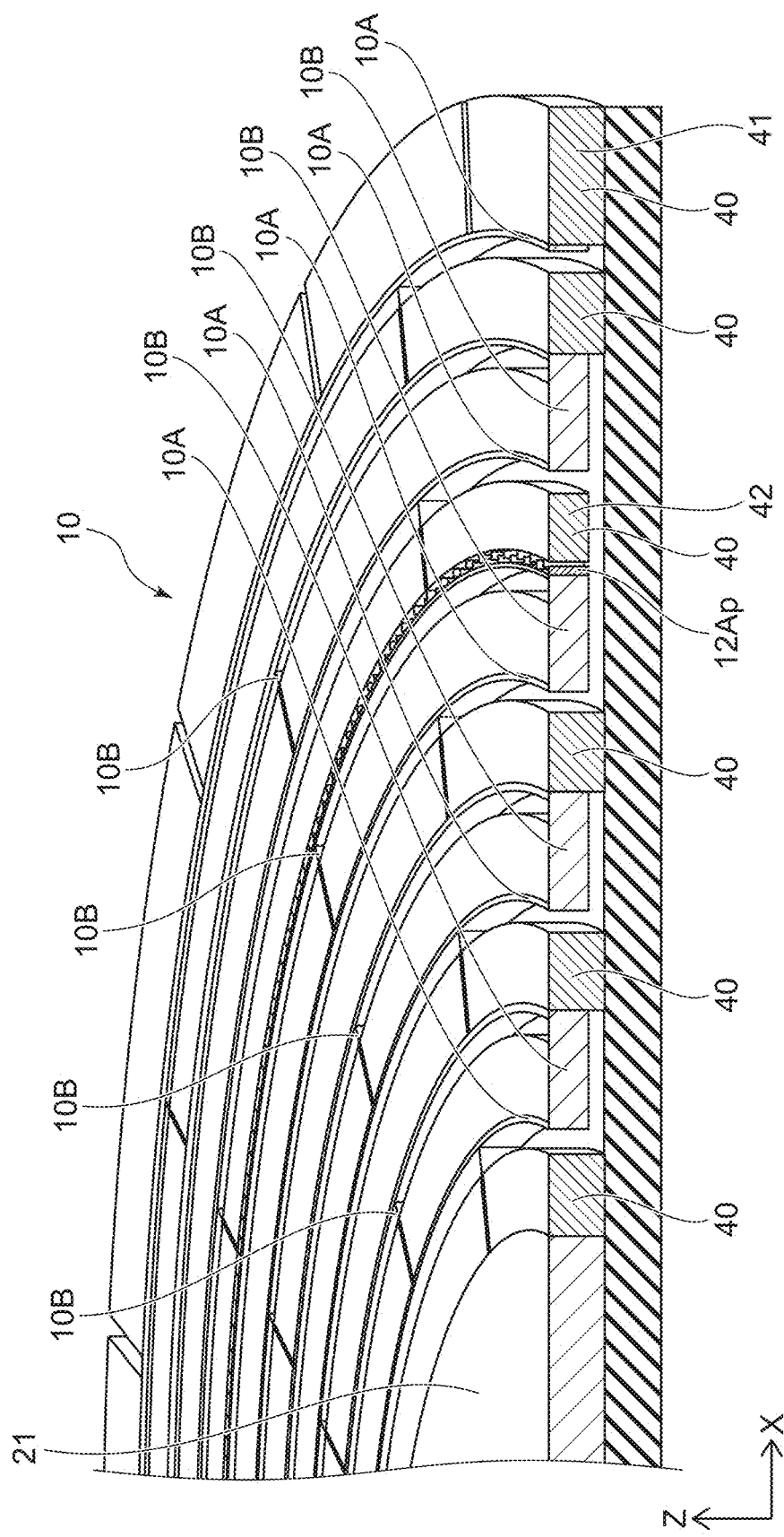
FIG. 5 is a schematic perspective view illustrating the sensor according to the first embodiment.
Figure 6:
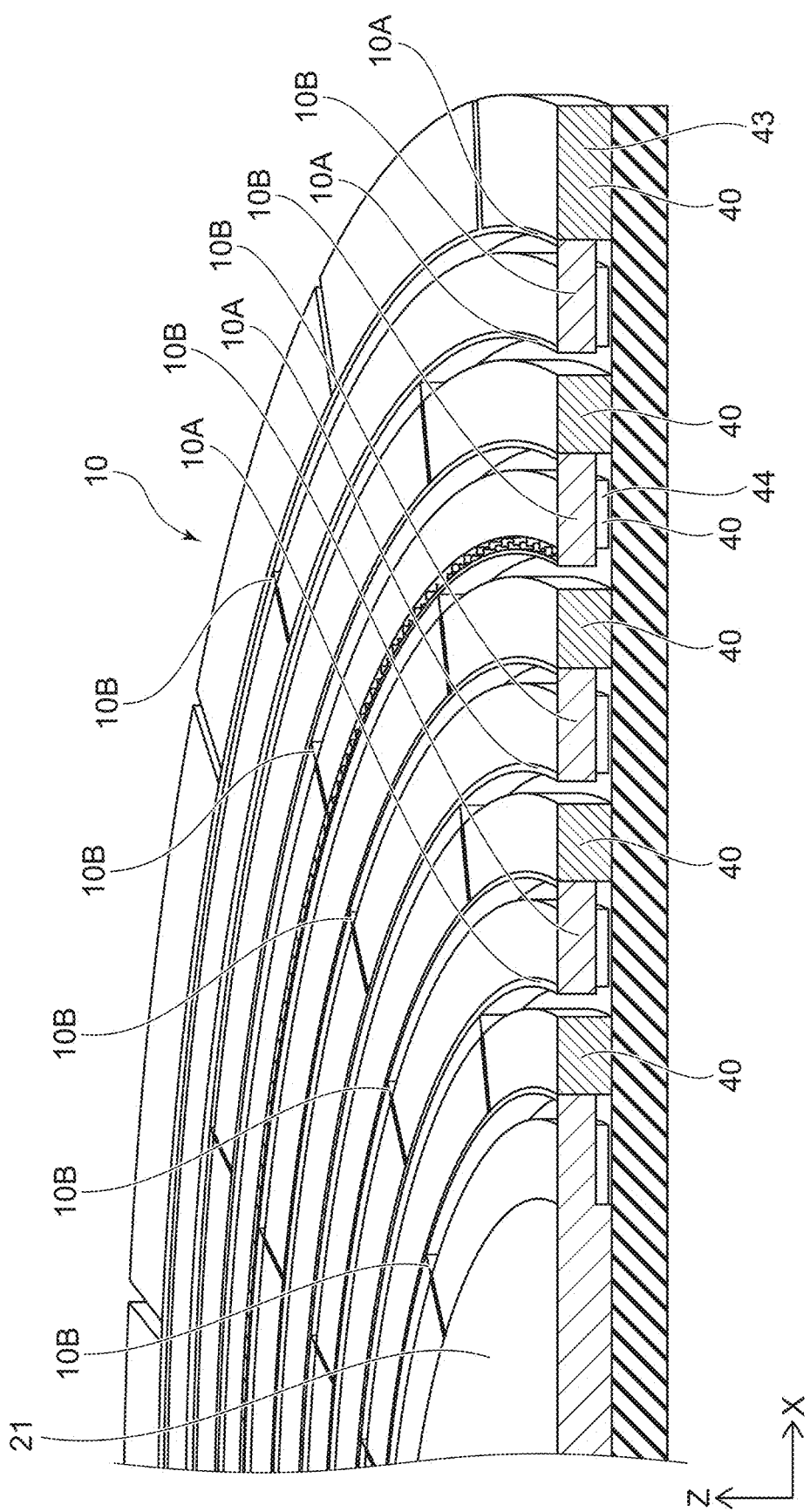
FIG. 6 is a schematic perspective view illustrating the sensor according to the first embodiment.

FIGS. 5 and 6 are schematic perspective views illustrating the sensor according to the first embodiment.

In FIGS. 5 and 6, the movable portion 10 is exemplified. In FIG. 5, the fixed electrode 40 in the A1-A2 line cross section of FIG. 1 is exemplified. In FIG. 6, the fixed electrode 40 in the B1-B2 line cross section of FIG. 1 is exemplified. In these figures, regarding the fixed electrode 40, other portions for these cross sections are omitted.

As shown in FIGS. 4A and 5, the first fixed electrode 41 is fixed to the base body 20. As shown in FIGS. 1 and 2, the first fixed electrode 41 faces a part of the first annular portion 11. The first fixed electrode 41 is one of a plurality of fixed electrodes 40.

As shown in FIGS. 4A and 5, the second fixed electrode 42 is fixed to the base body 20. The second fixed electrode 42 is one of the plurality of fixed electrodes 40. As shown in FIG. 2, the second fixed electrode 42 faces the first movable portion electrode 12A. The second fixed electrode 42 is one of the first comb tooth electrode pair 31T. The first movable portion electrode 12A is the other of the first comb tooth electrode pair 31T.

As shown in FIG. 2, the first movable portion electrode 12A includes a first movable base portion 12Ab and a plurality of first movable protrusions 12Ap. The plurality of first movable protrusions 12Ap are connected to the first movable base portion 12Ab.

As shown in FIG. 2, the second fixed electrode 42 includes a second fixed base portion 42b and a plurality of second fixed protrusions 42p. The plurality of second fixed protrusions 42p are connected to the second fixed base portion 42b.

At least one part of the plurality of first movable protrusions 12Ap is provided between one of the plurality of second fixed protrusions 42p and another one of the plurality of second fixed protrusions 42p. At least one portion of the plurality of second fixed protrusions 42p is provided between one of the plurality of first movable protrusions 12Ap and another of the plurality of first movable protrusions 12Ap.

As shown in FIG. 2, the first fixed electrode 41 includes a first fixed electrode surface 41f. The first fixed electrode surface 41f faces a part of the first annular portion 11. The first fixed electrode surface 41f has an arc shape centered on the first fixed portion 21. A part of the first annular portion 11 includes a first annular surface 11f. The first annular surface 11f faces the first fixed electrode 41. The first annular surface 11f has an arc shape centered on the first fixed portion 21. The first fixed electrode surface 41f is substantially parallel to, for example, the first annular surface 11f. The first fixed electrode 41 and the first annular portion 11 are, for example, a pair of parallel plate electrodes.

Thus, outer the first fixed electrode 41 and the first annular portion 11 are, for example, a pair of parallel plate electrodes. The second fixed electrode 42 and the first movable portion electrode 12A (the second annular portion 12) inside these electrodes are a pair of comb tooth electrodes.

As shown in FIG. 1, a controller 70 may be provided. The controller 70 may be included in the sensor 110. The controller 70 may be provided separately from the sensor 110. The controller 70 is electrically connected to the first fixed portion 21. As a result, the controller 70 is electrically connected to the movable portion 10. The controller 70 is electrically connected to the first fixed electrode 41 and the second fixed electrode 42. A signal (voltage) is applied between the movable portion 10 and the first fixed electrode 41 by the controller 70. The signal (voltage) is applied between the movable portion 10 and the second fixed electrode 42 by the controller 70. The movable portion 10 is displaced by the applied signal.

For example, when a signal is applied between the movable portion 10 and the first fixed electrode 41, the movable portion 10 vibrates. For example, the vibration state of the movable portion 10 changes when a force (angular velocity) is applied from the outside. For example, vibration in a direction crossing the direction of vibration based on the application of the signal occurs. By detecting the change in the vibration state, the force (the angular velocity) can be detected. For example, an angle can be detected by the sensor 110. The first fixed electrode 41 can function as, for example, a driving electrode or a detection electrode.

For example, a voltage is applied between the first movable portion electrode 12A (the second annular portion 12) and the second fixed electrode 42. By controlling the impedance of the current path to the first movable portion electrode 12A and the second fixed electrode 42, for example, damping characteristic of the vibration of the movable portion 10 is controlled. The second fixed electrode 42 can function as, for example, an adjusting electrode.

By applying a voltage to the parallel plate electrode pair, the movable portion 10 is efficiently displaced. Large displacements are obtained. For example, in a pair of parallel plate electrodes, a large signal can be obtained even with a slight displacement. By providing the parallel plate electrode pair on the outside, a larger displacement amount can be obtained. By providing the parallel plate electrode pair on the outside, a signal with higher sensitivity can be obtained. However, when the parallel plate electrode pair is vibrated with a large amplitude, the linearity of the displacement with respect to the applied voltage tends to decrease.

On the other hand, by applying a signal to the comb tooth electrode pair, the movable portion 10 can be displaced with high linearity with respect to the applied signal. The comb tooth electrode pair has a wide range of displacement with high linearity. For example, the linearity of displacement in a pair of comb tooth electrodes is higher than the linearity of displacement in a pair of parallel plate electrodes.

In the embodiment, a parallel plate electrode pair is provided on the outside, and a comb tooth electrode pair is provided on the inside the parallel plate electrode pair. As a result, a large displacement amount and a highly linear displacement can be obtained. Thereby, for example, the angle can be detected with low noise.

In the embodiment, vibration can be controlled with higher accuracy by using a highly linear comb tooth electrode pair, for example. It is easy to obtain the desired vibration. As a result, the angle can be detected stably. The embodiment can provide a sensor whose characteristics can be improved.

As shown in FIG. 1, the sensor 110 may include a detection electrode 41B. The detection electrode 41B may be included in the plurality of fixed electrodes 40. The detection electrode 41B is fixed to the base body 20. The controller 70 can acquire the detection signal Sd1 from the detection electrode 41B. The detection signal Sd1 responds to the external force. The detection signal Sd1 responds to, for example, a change in vibration of the movable portion 10 in response to the external force.

As shown in FIG. 1, a second direction D2 from the first fixed portion 21 to the first fixed electrode 41 crosses the first direction D1. The second direction D2 is along the first plane (for example, the X-Y plane). The second direction D2 is, for example, the X-axis direction. The second fixed electrode 42 is located between the first fixed portion 21 and the first fixed electrode 41 in the second direction D2.

As shown in FIG. 1, the sensor 110 may include a third fixed electrode 43. As shown in FIGS. 4B and 6, the third fixed electrode 43 is fixed to the base body 20. The third fixed electrode 43 is one of the plurality of fixed electrodes 40. The third fixed electrode 43 faces another part of the first annular portion 11. A third direction D3 from the first fixed portion 21 to the third fixed electrode 43 crosses the first direction D1. The third direction D3 is along the first plane (for example, the X-Y plane). The third direction D3 is inclined with respect to the second direction D2.

As shown in FIG. 3, the third fixed electrode 43 includes a third fixed electrode surface 43f. The third fixed electrode surface 43f faces another part of the first annular portion 11. The third fixed electrode surface 43f has an arc shape centered on the first fixed portion 21. Another portion of the first annular portion 11 includes a surface 11fa facing the third fixed electrode 43. The surface 11fa facing the third fixed electrode 43 has an arc shape centered on the first fixed portion 21. The third fixed electrode 43 and the first annular portion 11 are a pair of parallel plate electrodes. For example, the pair of parallel plate electrodes is provided on the outermost circumference.

In this example, an angle between the second direction D2 and the third direction D3 is 22.5 degrees. This angle may be, for example, greater than 0 degrees and not more than 22 degrees. This angle may be, for example, not less than 12 degrees and not more than 33 degrees. This angle may be, for example, not less than 57 degrees and not more than 78 degrees. This angle may be greater than 0 degrees and 22 degrees or less.

As shown in FIG. 1, the third fixed electrode 43 is next to the first fixed electrode 41 on a circle centered on the first fixed portion 21. No other fixed electrode is provided between the first fixed electrode 41 and the third fixed electrode 43.

As shown in FIGS. 1, 3, 4B and 6, the sensor 110 may include a fourth fixed electrode 44. The fourth fixed electrode 44 is fixed to the base body 20. The fourth fixed electrode 44 is one of the plurality of fixed electrodes 40. As shown in FIG. 3, the second annular portion 12 includes a second movable portion electrode 12B. The fourth fixed electrode 44 faces the second movable portion electrode 12B. The fourth fixed electrode 44 is one of the second comb tooth electrode pair 32T. The second movable portion electrode 12B is the other of the second comb tooth electrode pair 32T.

As shown in FIG. 3, the second movable portion electrode 12B includes a second movable base portion 12Bb and a plurality of second movable protrusions 12Bp. The plurality of second movable protrusions 12Bp are connected to the second movable base portion 12Bb.

As shown in FIG. 3, the fourth fixed electrode 44 includes a fourth fixed base portion 44b and a plurality of fourth fixed protrusions 44p. The plurality of fourth fixed protrusions 44p are connected to the fourth fixed base portion 44b.

At least a part of the plurality of second movable protrusions 12Bp is located between one of the plurality of fourth fixed protrusions 44p and another one of the plurality of fourth fixed protrusions 44p. At least a part of the plurality of fourth fixed protrusions 44p is located between one of the plurality of second movable protrusions 12Bp and another of the plurality of second movable protrusions 12Bp.

As shown in FIG. 1, the fourth fixed electrode 44 is located between the first fixed portion 21 and the third fixed electrode 43. A pair of comb tooth electrodes is provided on the inner portion away from the outermost circumference.

For example, the vibration characteristic (or vibration state) of the movable portion 10 may be adjusted by applying a signal (voltage) between the third fixed electrode 43 and the first annular portion 11. On the other hand, it is not necessary to apply a signal between the fourth fixed electrode 44 and the second movable portion electrode 12B of the second comb tooth electrode pair 32T. For example, the second comb tooth electrode pair 32T may not be used for operations such as drive, damper or adjustment. By providing the pair of comb tooth electrodes that are not used for operation, good symmetry can be obtained in the vibration characteristics of the movable portion 10. High-precision control becomes easy. It becomes easier to improve the characteristics.

For example, the controller 70 may be able to perform a first operation and a second operation described below. FIG. 2 illustrates the first operation OP1. As shown in FIG. 2, the controller 70 applies a first signal Sg1 between the first fixed portion 21 and the first fixed electrode 41 in the first operation OP1. The controller 70 applies a second signal Sg2 between the first fixed portion 21 and the second fixed electrode 42 in the first operation OP1. For example, the movable portion 10 vibrates due to the first signal Sg1. The vibration characteristic of the movable portion 10 is controlled by the second signal Sg2. For example, the damping characteristics of vibration are controlled.

FIG. 3 illustrates a second operation OP2. The controller 70 applies a third signal Sg3 between the first fixed portion 21 and the third fixed electrode 43 in the second operation OP2. In the second operation OP2, the controller 70 does not apply a signal between the first fixed portion 21 and the fourth fixed electrode 44. By applying the configuration of the comb tooth electrode pair to the fourth fixed electrode 44 to which no signal is applied, a good symmetry can be obtained.

In the embodiment, the movable portion 10 includes the plurality of annular portions 10A being concentric. The amount of displacement of each of the plurality of movable portions 10 is larger toward the outside. It is preferable that the vibration driving electrode (for example, a first fixed electrode 41 or the like), the adjusting electrode (for example, a third fixed electrode 43), the detection electrode 41B, or the like is provided in the outermost peripheral portion having a large displacement. For example, it is preferable that the comb tooth electrode pair that can obtain good linearity and have variable damping characteristics is provided inside the outermost circumference. If the comb tooth electrode pair is provided excessively inward, the controllability of the damping characteristic may be reduced. Therefore, it is preferable that the comb tooth electrode pair is provided inside of the outermost circumference and not excessively inside. For example, the comb tooth electrode pair is preferably provided between the inside and the outside, or between the middle and the outermost circumference.

For example, as shown in FIG. 1, the first annular portion 11 includes the outer edge portion 100. It is preferable that the third annular portion 13 includes the inner edge portion 10i, and a number of the annular portions 10A provided between the first annular portion 11 and the second annular portion 12 is not more than a number of the annular portions 10A provided between the second annular portion 12 and the third annular portion 13. Alternatively, it is preferable that a part of the plurality of annular portions 10A is provided between the second annular portion 12 and the third annular portion 13, and no annular portion 10A is provided between the first annular portion 11 and the second annular portion 12.

By providing the comb tooth electrode pair at such a position, the vibration driving electrode (for example, the first fixed electrode 41, etc.), the adjusting electrode (for example, the third fixed electrode 43), the detection electrode 41B, etc. are provided on the outermost circumference. The comb electrode pair is not provided excessively inside. High controllability of damping characteristics can be obtained.

The following is an example of the simulation result of the sensor characteristics. In the simulation, the number of the plurality of annular portions 10A is 9. The number of the plurality of annular portions 10A is referred to as a number N1. The number N1 of the annular portion 10A closest to the center (first fixed portion 21) is set to 1. The number N1 of the annular portion 10A farthest from the center (first fixed portion 21) is 9. In the simulation, a width of one of the plurality of annular portions 10A is larger than a width of others of the plurality of annular portions 10A. Each of the widths are, for example, a length along the radial direction (for example, may be the X-axis direction). In the simulation, the position of the annular portion 10A having a different width from the others is changed in the range of the number N1 from 1 to 9. The annular portion 10A having a different width corresponds to the annular portion 10A provided with the comb tooth electrode pair.

Figure 7A:
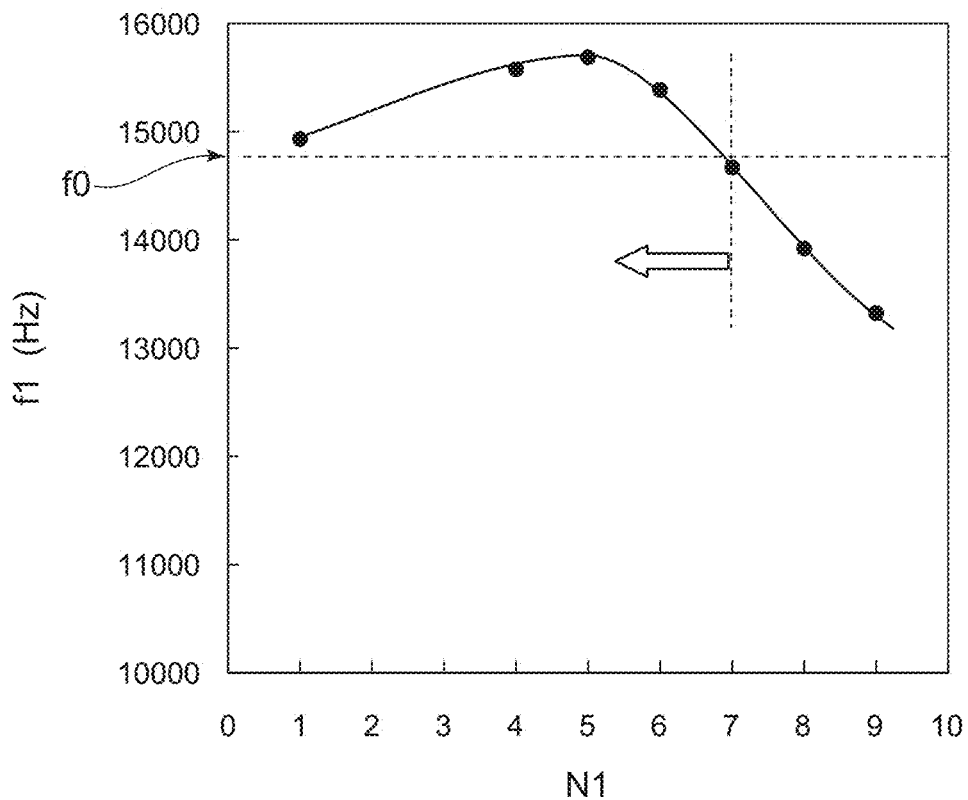
FIGS. 7A and 7B are graphs illustrating the characteristics of the sensor.
Figure 7B:
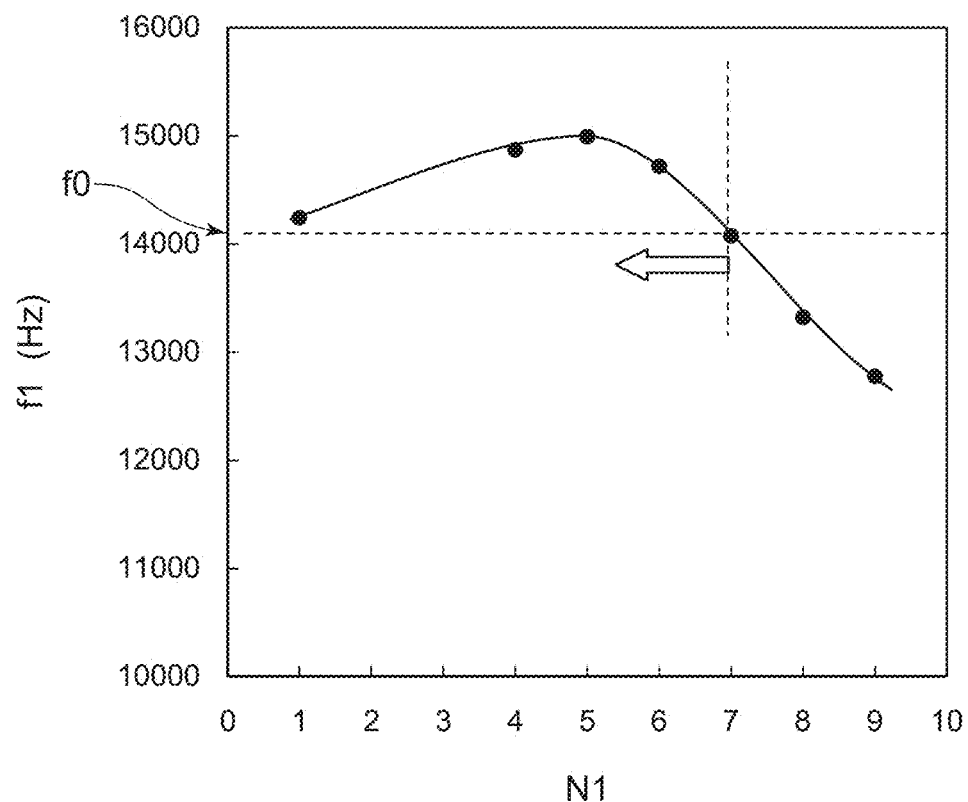

FIGS. 7A and 7B are graphs illustrating the characteristics of the sensor.

The horizontal axis of these figures corresponds to the number N1 of the plurality of annular portions 10A. The vertical axis is the resonance frequency f1. FIG. 7A corresponds to vibration along the X-axis direction. FIG. 7B corresponds to vibration along a direction inclined by 45 degrees with respect to the X-axis direction.

As shown in FIGS. 7A and 7B, the resonance frequency f1 decreases as the number N1 increases. These figures show the resonance frequency f0 when all the widths of the plurality of annular portions 10A are the same. As shown in FIGS. 7A and 7B, in the embodiment, the number N1 is preferably 7 or less. Thereby, the decrease of the resonance frequency f1 can be suppressed.

Figure 8:
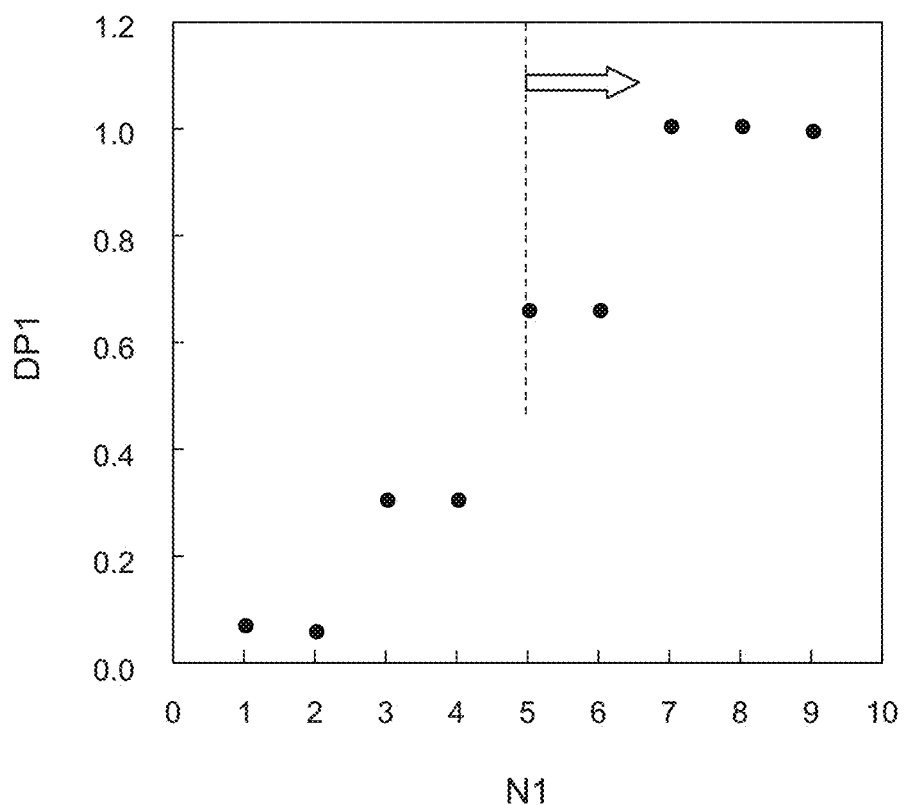
FIG. 8 is a graph illustrating the characteristics of the sensor.

FIG. 8 is a graph illustrating the characteristics of the sensor.

The horizontal axis of FIG. 8 corresponds to the number N1 of the plurality of annular portions 10A. The vertical axis of FIG. 8 is the displacement ratio DP1 in each of the numbers N1. The displacement ratio DP1 is a ratio of the displacement amount in the vibration of the annular portion 10A of the number N1 to the displacement amount in the vibration of the annular portion 10A in which the number N1 is 9. As shown in FIG. 8, when the number N1 is 7 or less and the number N1 becomes smaller, the displacement ratio DP1 becomes smaller. In the embodiment, the displacement ratio DP1 is preferably 0.7 or more. As a result, a practically large displacement ratio DP1 can be obtained in the comb tooth electrode pair. From the result of FIG. 8, it is preferable that the number N1 is 5 or more.

From the results of FIGS. 7A, 7B and 8, the number N1 is preferably not less than 5 and not more than 7. In the embodiment, the number of the plurality of annular portions 10A is NM1. The number of the annular portion 10A provided with the comb tooth electrode pair is preferably not less than a first integer and not more than a second integer. The first integer is the smallest integer that is not less than ½ of NM1. The second integer is the maximum integer that is not more than 7/10 of NM1.

As shown in FIG. 1, in the embodiment, a variable resistor Rc1 may be electrically connected to the second fixed electrode 42. The variable resistor Rc1 may be included in the controller 70. The variable resistor Rc1 may be included in the element portion including the movable portion 10 and the first fixed electrode 41 and the like. A switch 42s may be provided between the variable resistor Rc1 and the second fixed electrode 42. The controller 70 can apply a voltage between the first movable portion electrode 12A (the second annular portion 12) and the second fixed electrode 42 via the variable resistor Rc1. By changing the resistance of the variable resistor Rc1, the first movable portion electrode 12A and the second fixed electrode 42 function as a variable damper. The damping characteristic (for example, damping coefficient) of the vibration of the movable portion 10 can be controlled.

For example, by appropriately controlling the damping coefficient, the asymmetry of the vibration characteristics of the movable portion 10 can be suppressed. Thereby, angular drift can be suppressed and higher accuracy can be obtained.

As shown in FIG. 1, another fixed electrode of a parallel plate electrode pair may be provided at a position point-symmetrical to the first fixed electrode 41 with the first fixed portion 21 as the center. Another fixed electrode of the parallel plate electrode pair may be provided in the direction perpendicular to the direction from the first fixed portion 21 to the first fixed electrode 41. Another fixed electrode of the parallel plate electrode pair may be provided at a direction of 45 degrees with respect to the direction from the first fixed portion 21 to the first fixed electrode 41. Another fixed electrode of the parallel plate electrode pair may operate in the same manner as the first fixed electrode 41.

As shown in FIG. 1, another fixed electrode of the parallel plate electrode pair may be provided at a position point-symmetrical to the third fixed electrode 43 with the first fixed portion 21 as the center. Another fixed electrode of the parallel plate electrode pair may be provided in the direction perpendicular to the direction from the first fixed portion 21 to the third fixed electrode 43. Another fixed electrode of the parallel plate electrode pair may be provided at a direction of 45 degrees with respect to the direction from the first fixed portion 21 to the third fixed electrode 43. Another fixed electrode of the parallel plate electrode pair may operate in the same manner as the third fixed electrode 43.

As shown in FIG. 1, another fixed electrode of a pair of comb-shaped electrodes may be provided at a position point-symmetrical to the fourth fixed electrode 44 with the first fixed portion 21 as the center. Another fixed electrode of the comb-shaped electrode pair may be provided in a direction perpendicular to the direction from the first fixed portion 21 to the fourth fixed electrode 44. Another fixed electrode of the comb-shaped electrode pair may be provided at a direction of 45 degrees with respect to the direction from the first fixed portion 21 to the fourth fixed electrode 44.

Hereinafter, examples of operations performed by the sensor 110 will be described.

FIGS. 9 to 12 are schematic plan views illustrating the operation of the sensor.

Figure 9:
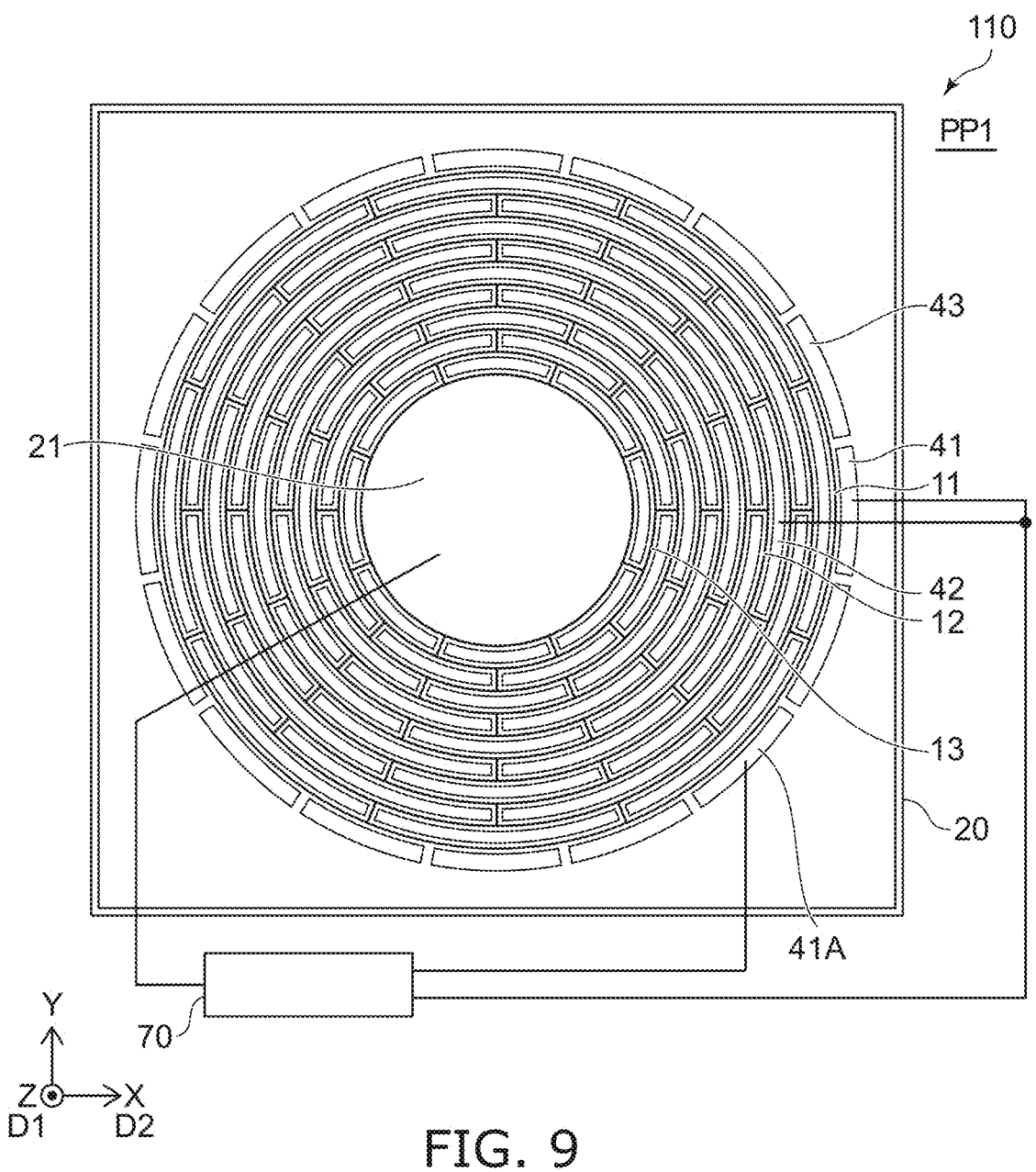
FIG. 9 is a schematic plan view illustrating an operation of the sensor.

In an operation PP1 illustrated in FIG. 9, a signal for excitation is supplied from the controller 70 to the first fixed electrode 41 and another fixed electrode 41A. In this example, the angle between the direction from the first fixed portion 21 to the first fixed electrode 41 and the direction from the first fixed portion 21 to another fixed electrode 41A is substantially 45 degrees. The operation PP1 is, for example, an excitation operation. For example, in the operation PP1, a signal is applied to the second fixed electrode 42 via the variable resistor Rc (see FIG. 1). For example, the damping characteristics are adjusted.

Figure 10:
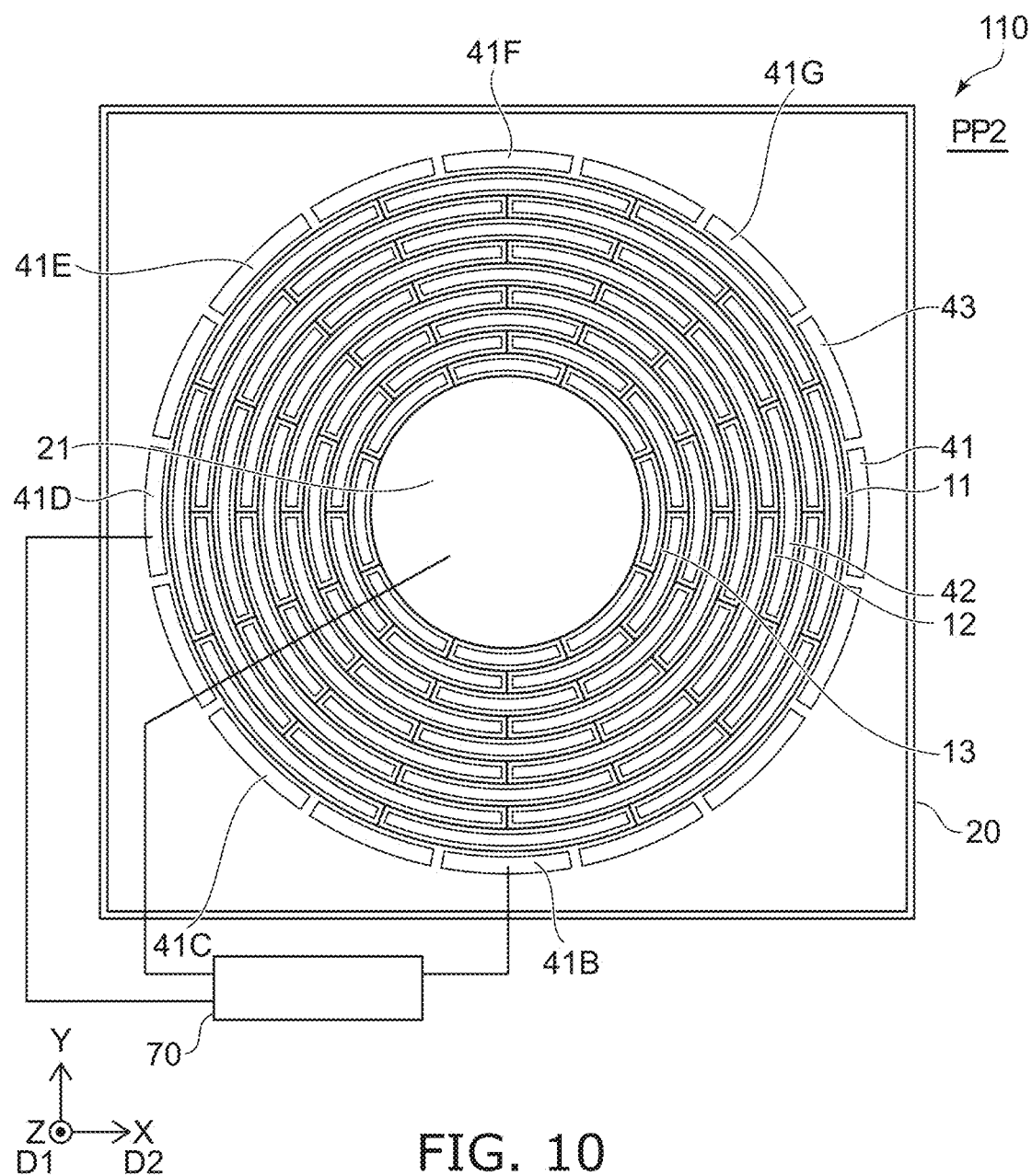
FIG. 10 is a schematic plan view illustrating the operation of the sensor.

In an operation PP2 illustrated in FIG. 10, a signal generated in the detection electrode 41B and a signal generated in another fixed electrode 41D are detected by the controller 70. The angle between the direction from the first fixed portion 21 to the detection electrode 418 and the direction from the first fixed portion 21 to another fixed electrode 41D is substantially 90 degrees. In this example, the angle between the direction from the first fixed portion 21 to the detection electrode 418 and the direction from the first fixed portion 21 to the first fixed electrode 41 is substantially 90 degrees.

In the operation PP2, for example, a signal generated in another fixed electrode 41C and a signal generated in another fixed electrode 41E may be detected by the controller 70. The angle between the direction from the first fixed portion 21 to the other fixed electrode 41C and the direction from the first fixed portion 21 to the other fixed electrode 41E is substantially 90 degrees.

In the operation PP2, for example, a signal generated in another fixed electrode 41G and a signal generated in another fixed electrode 41E may be detected by the controller 70. The angle between the direction from the first fixed portion 21 to the other fixed electrode 41G and the direction from the first fixed portion 21 to the other fixed electrode 41E is substantially 90 degrees.

Figure 11:
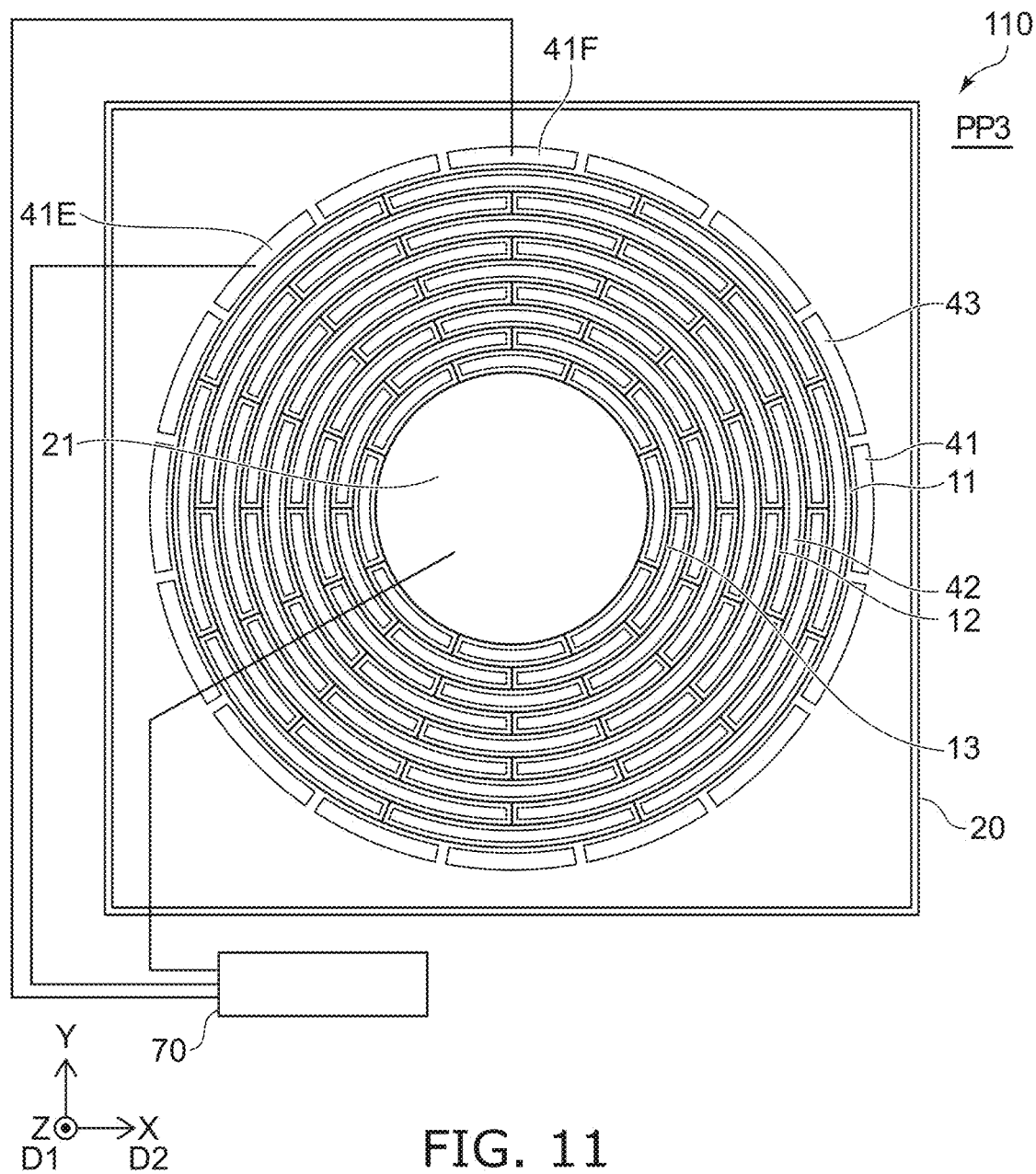
FIG. 11 is a schematic plan view illustrating the operation of the sensor.

In an operation PP3 illustrated in FIG. 11, a signal for frequency adjustment is supplied from the controller 70 to at least one of another fixed electrode 41E and another fixed electrode 41E. The angle between the direction from the first fixed portion 21 to the other fixed electrode 41E and the direction from the first fixed portion 21 to the other fixed electrode 41F is substantially 45 degrees. In this example, the angle between the direction from the first fixed portion 21 to the first fixed electrode 41 and the direction from the first fixed portion 21 to another fixed electrode 41F is substantially 90 degrees. The operation PP3 is, for example, a frequency adjustment operation.

Figure 12:
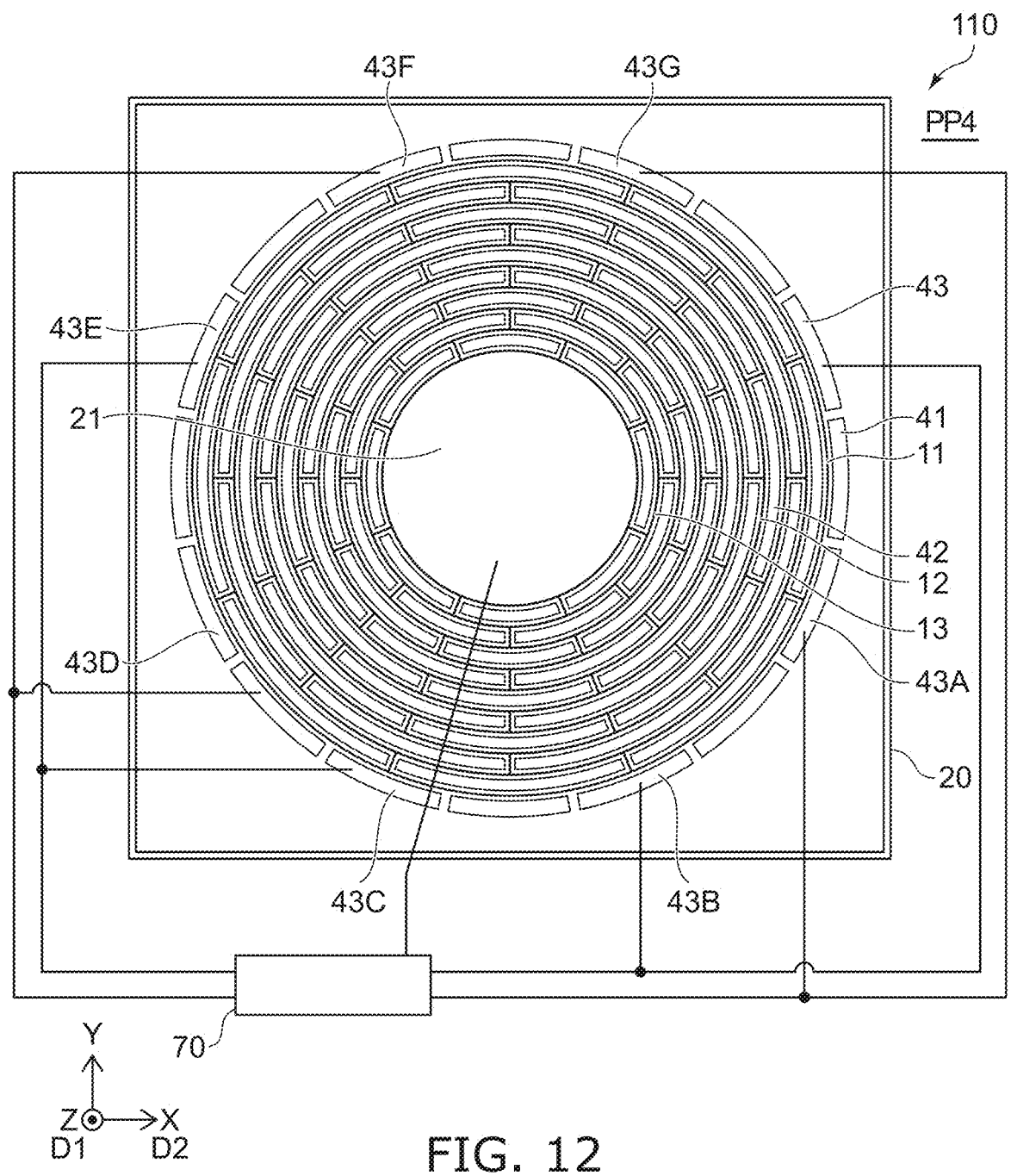
FIG. 12 is a schematic plan view illustrating the operation of the sensor.

In one example of an operation PP4 illustrated in FIG. 12, a signal for vibration adjustment is provided from the controller 70 to the third fixed electrode 43, another fixed electrode 438, another fixed electrode 43D, and another fixed electrode 43F. In another example of the operation PP4, the controller 70 supplies a vibration adjusting signal to another fixed electrode 43A, another fixed electrode 43C, another fixed electrode 43E, and another fixed electrode 43G. The angle between the direction from the first fixed portion 21 to the third fixed electrode 43 and the direction from the first fixed portion 21 to another fixed electrode 43B is substantially 90 degrees. The angle from the direction from the first fixed portion 21 to the third fixed electrode 43 to the direction from the first fixed portion 21 to another fixed electrode 43D is substantially 180 degrees. The angle from the direction from the first fixed portion 21 to the third fixed electrode 43 to the direction from the first fixed portion 21 to another fixed electrode 43F is substantially 270 degrees. The angle from the direction from the first fixed portion 21 to the third fixed electrode 43 to the direction from the first fixed portion 21 to another fixed electrode 43A is substantially 45 degrees. The angle from the first fixed portion 21 to the other fixed electrode 43A to the direction from the first fixed portion 21 to the other fixed electrode 43C is substantially 90 degrees. The angle from the first fixed portion 21 to the other fixed electrode 43A to the direction from the first fixed portion 21 to the other fixed electrode 43E is substantially 180 degrees. The angle from the first fixed portion 21 to the other fixed electrode 43A to the direction from the first fixed portion 21 to the other fixed electrode 43G is substantially 270 degrees. The operation PP4 is, for example, a quadrature control operation.

The embodiments may include the following configurations (for example, technical proposals).

(Configuration 1)

A sensor, comprising:
a base body;
a first fixed portion fixed to the base body;
a movable portion supported by the first fixed portion, a first gap being provided between the base body and the movable portion, the movable portion including a plurality of annular portions and a plurality of connecting portions, the annular portions being concentric with the first fixed portion as a center in a first plane crossing a first direction from the base body to the first fixed portion, one of the connecting portions connecting one of the annular portions and an other one of the annular portions, the annular portions including a first annular portion, a second annular portion, and a third annular portion, the second annular portion being between the first fixed portion and the first annular portion, the third annular portion being between the first fixed portion and the second annular portion, the second annular portion including a first movable portion electrode;
a first fixed electrode fixed to the base body and facing a part of the first annular portion; and
a second fixed electrode fixed to the base body and facing the first movable portion electrode, the second fixed electrode being one of a first comb tooth electrode pair, the first movable portion electrode being other of the first comb tooth electrode pair.

(Configuration 2)

The sensor according to Configuration 1, wherein
the movable portion includes an inner edge portion and an outer edge portion,
the first annular portion includes the outer edge portion,
the third annular portion includes the inner edge portion, and
a number of the annular portions provided between the first annular portion and the second annular portion is not more than a number of the annular portions provided between the second annular portion and the third annular portion.

(Configuration 3)

The sensor according to Configuration 1, wherein
the movable portion includes an inner edge portion and an outer edge portion,
the first annular portion includes the outer edge portion,
the third annular portion includes the inner edge portion, a part of the annular portions is provided between the second annular portion and the third annular portion, and a part of the annular portions is not provided between the first annular portion and the second annular portion.

(Configuration 4)

The sensor according to any one of Configurations 1-3, wherein the annular portions are substantially circular.

(Configuration 5)

The sensor according to any one of Configurations 1-4, wherein the connecting portions extend along an axial direction passing the first fixed portion, and an axial direction is along the first plane.

(Configuration 6)

The sensor according to any one of Configurations 1-5, wherein the first movable portion electrode includes a first movable base portion and a plurality of first movable protrusion portions, the first movable protrusions are connected to the first movable base portion, the second fixed electrode includes a second fixed base portion and a plurality of second fixed protrusions, the second fixed protrusions are connected to the second fixed base portion, at least a part of one of the second annular protrusions is provided between one of the second fixed protrusions and an other one of the second fixed protrusions, and at least a part of the one of the second fixed protrusions is provided between one of the first movable protrusions and an other of the first movable protrusions.

(Configuration 7)

The sensor according to any one of Configurations 1-6, wherein the first fixed electrode includes a first fixed electrode surface facing the part of the first annular portion, and the first fixed electrode surface has an arc shape centered on the first fixed portion, and the part of the first annular portion includes a first annular portion surface facing the first fixed electrode, and the first annular portion surface has an arc shape centered on the first fixed portion.

(Configuration 8)

The sensor according to any one of Configurations 1-7, wherein a second direction from the first fixed portion to the first fixed electrode crosses the first direction and is along the first plane, and the second fixed electrode is located between the first fixed portion and the first fixed electrode in the second direction.

(Configuration 9)

The sensor according to Configuration 8, further comprising a third fixed electrode fixed to the base body, the third fixed electrode facing an other part of the first annular portion, a third direction from the first fixed portion to the third fixed electrode crossing the first direction and being along the first plane, and the third direction being inclined with respect to the second direction.

(Configuration 10)

The sensor according to Configuration 9, wherein the third fixed electrode includes a third fixed electrode surface facing the other part of the first annular portion, the third fixed electrode surface has an arc shape centered on the first fixed portion, the other part of the first annular portion includes a surface facing the third fixed electrode, and the surface facing the third fixed electrode has an arc shape centered on the first fixed portion, (Configuration 11)

The sensor according to of Configuration 9 or 10, wherein an angle between the second direction and the third direction is not less than 12 degrees and not more than 33 degrees, or not less than 57 degrees and not more than 78 degrees.

(Configuration 12)

The sensor according to Configuration 9 or 10, wherein the third fixed electrode is next to the first fixed electrode on a circle centered on the first fixed portion.

(Configuration 13)

The sensor according to Configuration 9 or 10, further comprising a fourth fixed electrode fixed to the base body, the second annular portion including a second movable portion electrode, the fourth fixed electrode facing the second movable portion electrode, and the fourth fixed electrode being one of a second comb tooth electrode pair, the second movable part electrode being an other of the second comb tooth electrode pair.

(Configuration 14)

The sensor according to Configuration 13, wherein the fourth fixed electrode is located between the first fixed portion and the third fixed electrode.

(Configuration 15)

The sensor according to Configuration 13, wherein an angle between the second direction and the third direction is greater than 0 degrees and not more than 22 degrees.

(Configuration 16)

The sensor according to any one of Configurations 13-15, wherein the first fixed portion and the movable portion are conductive, and the movable portion is electrically connected to the first fixed portion.

(Configuration 17)

The sensor according to Configuration 16, further comprising a controller, the controller being configured to perform a first operation, in the first operation, the controller being configured to apply a first signal between the first fixed portion and the first fixed electrode, and apply a second signal between the first fixed portion and the second fixed electrode, (Configuration 18)

The sensor according to Configuration 17, wherein a vibration characteristic of the movable part is controlled by the second signal.

(Configuration 19)

The sensor according to Configuration 17 or 18, wherein the controller is configured to perform a second operation, and in the second operation, the controller is configured to apply a third signal between the first fixed portion and the third fixed electrode, and apply no signal between the first fixed portion and the fourth fixed electrode.

(Configuration 20)

The sensor according to any one of Configurations 17-19, further comprising a detection electrode fixed to the base body, the controller being configured to acquire a detection signal corresponding to an external force from the detection electrode.

According to the embodiment, it is possible to provide a sensor capable of stable detection.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as base bodies, fixed portions, moving portions, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are Intended to cover such forms or modifications as would fall within the scope and spirit of the invention.

What is claimed is:

1. A sensor, comprising:
a base body;
a first fixed portion fixed to the base body;
a movable portion supported by the first fixed portion, a first gap being provided between the base body and the movable portion, the movable portion including a plurality of annular portions and a plurality of connecting portions, the annular portions being concentric with the first fixed portion as a center in a first plane crossing a first direction from the base body to the first fixed portion, one of the connecting portions connecting one of the annular portions and an other one of the annular portions, the annular portions including a first annular portion, a second annular portion, and a third annular portion, the second annular portion being between the first fixed portion and the first annular portion, the third annular portion being between the first fixed portion and the second annular portion, the second annular portion including a first movable portion electrode;
a first fixed electrode fixed to the base body and facing a part of the first annular portion; and
a second fixed electrode fixed to the base body and facing the first movable portion electrode, the second fixed electrode being one of a first comb tooth electrode pair, the first movable portion electrode being other of the first comb tooth electrode pair,
wherein
the first movable portion electrode includes a first movable base portion and a plurality of first movable protrusion,
the first movable protrusions are connected to the first movable base portion,
the second fixed electrode includes a second fixed base portion and a plurality of second fixed protrusions,
the second fixed protrusions are connected to the second fixed base portion,
at least a part of one of the second annular protrusions is provided between one of the second fixed protrusions and an other one of the second fixed protrusions, and
at least a part of the one of the second fixed protrusions is provided between one of the first movable protrusions and an other of the first movable protrusions.

2. The sensor according to claim 1, wherein
the movable portion includes an inner edge portion and an outer edge portion,
the first annular portion includes the outer edge portion,
the third annular portion includes the inner edge portion, and
a number of the annular portions provided between the first annular portion and the second annular portion is not more than a number of the annular portions provided between the second annular portion and the third annular portion.

3. The sensor according to claim 1, wherein
the movable portion includes an inner edge portion and an outer edge portion,
the first annular portion includes the outer edge portion,
the third annular portion includes the inner edge portion,
a part of the annular portions is provided between the second annular portion and the third annular portion, and
a part of the annular portions is not provided between the first annular portion and the second annular portion.

4. The sensor according to claim 1, wherein the annular portions are substantially circular.

5. The sensor according to claim 1, wherein the connecting portions extend along an axial direction passing the first fixed portion, and an axial direction is along the first plane.

6. The sensor according to claim 1, wherein
the first fixed electrode includes a first fixed electrode surface facing the part of the first annular portion, and the first fixed electrode surface has an arc shape centered on the first fixed portion, and
the part of the first annular portion includes a first annular portion surface facing the first fixed electrode, and the first annular portion surface has an arc shape centered on the first fixed portion.

7. The sensor according to claim 1, wherein
a second direction from the first fixed portion to the first fixed electrode crosses the first direction and is along the first plane, and
the second fixed electrode is located between the first fixed portion and the first fixed electrode in the second direction.

8. A sensor, comprising:
a base body;
a first fixed portion fixed to the base body;
a movable portion supported by the first fixed portion, a first gap being provided between the base body and the movable portion, the movable portion including a plurality of annular portions and a plurality of connecting portions, the annular portions being concentric with the first fixed portion as a center in a first plane crossing a first direction from the base body to the first fixed portion, one of the connecting portions connecting one of the annular portions and an other one of the annular portions, the annular portions including a first annular portion, a second annular portion, and a third annular portion, the second annular portion being between the first fixed portion and the first annular portion, the third annular portion being between the first fixed portion and the second annular portion, the second annular portion including a first movable portion electrode;

a first fixed electrode fixed to the base body and facing a part of the first annular portion; and a second fixed electrode fixed to the base body and facing the first movable portion electrode, the second fixed electrode being one of a first comb tooth electrode pair, the first movable portion electrode being other of the first comb tooth electrode pair; and a third fixed electrode fixed to the base body, wherein a second direction from the first fixed portion to the first fixed electrode crosses the first direction and is along the first plane, the second fixed electrode is located between the first fixed portion and the first fixed electrode in the second direction, the third fixed electrode faces an other part of the first annular portion, a third direction from the first fixed portion to the third fixed electrode crosses the first direction and is along the first plane, and the third direction being inclined with respect to the second direction.

9. The sensor according to claim 8, wherein the third fixed electrode includes a third fixed electrode surface facing the other part of the first annular portion, the third fixed electrode surface has an arc shape centered on the first fixed portion, the other part of the first annular portion includes a surface facing the third fixed electrode, and the surface facing the third fixed electrode has an arc shape centered on the first fixed portion.

10. The sensor according to of claim 8, wherein an angle between the second direction and the third direction is not less than 12 degrees and not more than 33 degrees, or not less than 57 degrees and not more than 78 degrees.

11. The sensor according to claim 8, wherein the third fixed electrode is next to the first fixed electrode on a circle centered on the first fixed portion.

12. The sensor according to claim 8, further comprising a fourth fixed electrode fixed to the base body, the second annular portion including a second movable portion electrode, the fourth fixed electrode facing the second movable portion electrode, and the fourth fixed electrode being one of a second comb tooth electrode pair, the second movable part electrode being an other of the second comb tooth electrode pair.

13. The sensor according to claim 12, wherein the fourth fixed electrode is located between the first fixed portion and the third fixed electrode.

14. The sensor according to claim 12, wherein an angle between the second direction and the third direction is greater than 0 degrees and not more than 22 degrees.

15. The sensor according to claim 12, wherein the first fixed portion and the movable portion are conductive, and the movable portion is electrically connected to the first fixed portion.

16. The sensor according to claim 15, further comprising a controller, the controller being configured to perform a first operation, in the first operation, the controller being configured to apply a first signal between the first fixed portion and the first fixed electrode, and apply a second signal between the first fixed portion and the second fixed electrode.

17. The sensor according to claim 16, wherein a vibration characteristic of the movable part is controlled by the second signal.

18. The sensor according to claim 16, wherein the controller is configured to perform a second operation, and in the second operation, the controller is configured to apply a third signal between the first fixed portion and the third fixed electrode, and apply no signal between the first fixed portion and the fourth fixed electrode.

19. The sensor according to claim 16, further comprising a detection electrode fixed to the base body, the controller being configured to acquire a detection signal corresponding to an external force from the detection electrode.

20. The sensor according to claim 7, further comprising a third fixed electrode fixed to the base body, the third fixed electrode facing an other part of the first annular portion, a third direction from the first fixed portion to the third fixed electrode crossing the first direction and being along the first plane, and the third direction being inclined with respect to the second direction.

* * * * *